United States Patent
Mihara et al.

(10) Patent No.: US 7,628,316 B2
(45) Date of Patent: Dec. 8, 2009

(54) RECYCLED PRODUCT DISTRIBUTION SUPPORT APPARATUS AND PROGRAM

(75) Inventors: Masamichi Mihara, Chiba (JP); Kazuhito Kobori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 684 days.

(21) Appl. No.: 11/221,737

(22) Filed: Sep. 9, 2005

(65) Prior Publication Data

US 2006/0065711 A1  Mar. 30, 2006

(30) Foreign Application Priority Data

Sep. 30, 2004  (JP) ............................. 2004-287729

(51) Int. Cl.
G06F 17/00 (2006.01)
(52) U.S. Cl. ................... 235/375; 235/376; 235/385; 705/1; 705/7
(58) Field of Classification Search ................. 235/375, 235/376, 385; 705/1, 7
See application file for complete search history.

(56) References Cited

U.S. PATENT DOCUMENTS

| | | | |
|---|---|---|---|
| 5,960,402 A * | 9/1999 | Embutsu et al. ............... 705/1 |
| 6,732,417 B2 * | 5/2004 | Kaburagi et al. ......... 29/407.01 |
| 7,344,063 B2 * | 3/2008 | Wagner et al. ............... 235/375 |
| 2002/0010611 A1 | 1/2002 | Yamaji et al. |
| 2002/0055883 A1 | 5/2002 | Shiba et al. |
| 2006/0065711 A1 * | 3/2006 | Mihara et al. ............... 235/375 |

FOREIGN PATENT DOCUMENTS

| EP | 0 591 615 A2 | 4/1994 |
|---|---|---|
| JP | 2003-16179 | 1/2003 |

OTHER PUBLICATIONS

Kishore K. Pochampally, et al., "A Business-Mapping Approach to Multi-Criteria Group Selection of Collection Centers and Recovery Facilities", Electronics and the Environment, IEEE, XP-010706276, May 10, 2004, pp. 249-254.

* cited by examiner

Primary Examiner—Allyson N Trail
(74) Attorney, Agent, or Firm—Oblon, Spivak, McClelland, Maier & Neustadt, L.L.P.

(57) ABSTRACT

A recycling management apparatus acquires stock quantity information, past collection quantity information, and yield information for each type of products, cost information indicating costs for collecting and recovering used products, etc. from a client terminal via communication network and stores the information, while computing and storing stock reference quantity of each type of products. When receiving order information from the terminal at a sales base point, the apparatus computes a collection quantity of used products based on the ordered quantity, stock quantity, and stock reference quantity. The apparatus selects collection base point candidates which can collect the computed collection quantity of used products based on the past collection quantity information, and appoints a collection base point that is to collect used products from the selected candidates based on the cost information. The apparatus creates instruction information and sends it to the terminal at the appointed base point via network.

5 Claims, 13 Drawing Sheets

| | TYPE A | TYPE B | TYPE C | TYPE D | ... | KEEPING COST |
|---|---|---|---|---|---|---|
| COLLECTION BASEPOINT1 | 40 | 5 | 100 | 50 | ... | 400 YEN/ APPARATUS |
| COLLECTION BASEPOINT2 | 20 | 5 | 60 | 50 | ... | 300 YEN/ APPARATUS |
| COLLECTION BASEPOINT3 | 10 | 0 | 30 | 20 | ... | 300 YEN/ APPARATUS |
| COLLECTION BASEPOINT4 | 10 | 0 | 20 | 20 | ... | 350 YEN/ APPARATUS |
| ... | ... | ... | ... | ... | ... | ... |

COLLECTION BASE POINT INFORMATION DATABASE

FIG.5A

|  | RECOVERY BASEPOINT1 | RECOVERY BASEPOINT2 | RECOVERY BASEPOINT3 | RECOVERY BASEPOINT4 | ... |
|---|---|---|---|---|---|
| COLLECTION BASEPOINT1 | 2000 YEN/ APPARATUS | 1800 YEN/ APPARATUS | 1500 YEN/ APPARATUS | 1100 YEN/ APPARATUS | ... |
| COLLECTION BASEPOINT2 | 1800 YEN/ APPARATUS | 1500 YEN/ APPARATUS | 1000 YEN/ APPARATUS | 2000 YEN/ APPARATUS | ... |
| COLLECTION BASEPOINT3 | 1500 YEN/ APPARATUS | 1000 YEN/ APPARATUS | 2000 YEN/ APPARATUS | 1800 YEN/ APPARATUS | ... |
| COLLECTION BASEPOINT4 | 1000 YEN/ APPARATUS | 2100 YEN/ APPARATUS | 1900 YEN/ APPARATUS | 1400 YEN/ APPARATUS | ... |
| ... | ... | ... | ... | ... | ... |

COST INFORMATION DATABASE

FIG.5B

|  | RECOVERY BASEPOINT1 | RECOVERY BASEPOINT2 | RECOVERY BASEPOINT3 | RECOVERY BASEPOINT4 | ⋮ |
|---|---|---|---|---|---|
| TYPE A | 100 |  |  |  | ⋮ |
| TYPE A |  | 50 |  |  | ⋮ |
| TYPE A |  |  | 100 |  | ⋮ |
| TYPE A |  |  | 40 | 40 | ⋮ |
| ⋮ | ⋮ | ⋮ | ⋮ | ⋮ | ⋮ |

RECOVERY BASE POINT INFORMATION DATABASE

FIG.5C

| | SALES BASE POINT | | | | COLLECTION BASE POINT | | | | RECOVERY BASE POINT | | | | |
|---|---|---|---|---|---|---|---|---|---|---|---|---|---|
| | 1 | ... | n | TOTAL | 1 | ... | 4 | TOTAL | 1 | ... | 4 | TOTAL | ... |
| TYPE A | * | ... | * | 20 | * | ... | * | 0 | * | ... | * | 0 | ... |
| TYPE B | * | ... | * | 0 | * | ... | * | 10 | * | ... | * | 0 | ... |
| TYPE C | * | ... | * | 0 | * | ... | * | 0 | * | ... | * | 10 | ... |
| TYPE D | * | ... | * | 5 | * | ... | * | 5 | * | ... | * | 5 | ... |
| ... | | | | | | | | | | | | | |

STOCK TABLE

FIG.6A

| | SALES STOCK REFERENCE QUANTITY | RECOVERY YIELD | COLLECTED APPARATUS STOCK REFERENCE QUANTITY |
|---|---|---|---|
| TYPE A | 50 APPARATUSES | 85% | 50 APPARATUSES |
| TYPE B | 25 APPARATUSES | 64% | 25 APPARATUSES |
| TYPE C | 80 APPARATUSES | 75% | 80 APPARATUSES |
| TYPE D | 30 APPARATUSES | 80% | 30 APPARATUSES |
| ... | ... | ... | ... |

INDICATOR TABLE

FIG.6B

| MANUFACTURE DATE | MANUFACTURE NUMBER | SIMPLIFIED RECOVERY | INTENSIVE RECOVERY | RESOURCE RECOVERY |
|---|---|---|---|---|
| 2000.10 – 2001.9 | 1 – 20000 | × | × | ○ |
| 2001.10 – 2002.9 | 20001 – 45000 | × | ○ | × |
| 2002.10 – 2003.9 | 45001 – | ○ | × | × |
| ... | ... | ... | ... | ... |

RECYCLING METHOD TABLE

FIG.6C

RECYCLED PRODUCT DISTRIBUTION SUPPORT APPARATUS AND PROGRAM

BACKGROUND OF THE INVENTION

1. Field of the Invention

The present invention relates to a recycled product distribution support apparatus and program, and particularly relates to a recycled product distribution support system and program for supporting efficient product recycling.

2. Description of the Related Art

Conventionally, products made by manufacturers have in many cases been disposed when the life of the products is completed by their users. However, people become more and more concerned about environmental problems recently, and companies including manufacturers feel the necessity of reducing environmental impacts given by the products having ended their life. Hence, product recycling is commonly done as a way to reduce environmental impacts.

Product recycling includes product reusing where a product is recovered to a reusable state and reused, and resource recovering where a product is changed into reusable resources component by component. In case of resource recovering, products have to be decomposed, classified, and transported to different resource recovery facilities for respective components, and environmental impacts are often produced in these processes. On the other hand, in case of product reusing, components are replaced to maintain the functions of the products, and then the products can be transported in an assembled state. Accordingly, product reusing is a recycling method less environmentally hazardous. Therefore, product recycling in the product reusing manner is effective in reducing the overall environmental impacts.

An information system for carrying out such efficient product recycling is proposed in, for example, Unexamined Japanese Patent Application KOKAI Publication No. 2003-16179. As described above, product reusing is a recycling method effective for reducing environmental impacts, and therefore demanded to be more widely spread. If product reusing is more widely spread, recycled products to be reused can have a market value as high as products newly manufactured. Therefore, likewise the distribution process of ordinary products, avoiding overstocking of recycled products and distributing recycled products at lower costs will lead the recycled products to have an increased market competitiveness. As a result, it can be expected that product reusing will be more promoted to contribute to the reduction of environmental impacts. Thus, it is demanded that a method capable of efficiently distributing recycled products be established.

SUMMARY OF THE INVENTION

The present invention was made in view of the above circumstance and an object of the present invention is to provide a recycled product distribution support apparatus and program for realizing improved efficiency in distribution for product reusing.

To achieve the above object, a recycled product distribution support apparatus according to a first aspect of the present invention comprises:

a storage unit which acquires information from a client terminal via a communication-network and stores the information;

an order information reception unit which receives order information from the client terminal via the communication network;

a collection necessity determination unit which determines whether or not it is necessary to collect used products necessary for supplying recycled products having been ordered, based on the order information received by the order information reception unit and the information stored in the storage unit;

a collection base point appointing unit which appoints a collection base point which will be in charge of collection of the used products, in a case where the collection necessity determination unit determines that it is necessary to collect used products; and an instruction unit which creates instruction information for instructing that the used products be kept, and sends the instruction information to the client terminal installed at the collection base point appointed by the collection base point appointing unit, wherein the collection base point appointing unit appoints a collection base point based on a cost required for collecting the used products.

In the above-described recycled product distribution support apparatus, it is preferred that: the storage unit stores information indicating a stock quantity of each type of products and a stock reference quantity of each type of products; and the collection necessity determination unit determines whether or not it is necessary to collect used products, based on an ordered quantity indicated in the order information, and the stock quantity and stock reference quantity stored in the storage unit.

In this case, it is preferred that: the storage unit stores collection performance information indicating a collection performance of each type of products at each collection base point, and cost information indicating a transportation cost required from a collection base point to a recovery base point and a keeping cost required at each collection base point; and the collection base point appointing unit computes a necessary collection quantity representing how many used products should be collected, based on the ordered quantity indicated in the order information and the stock quantity and stock reference quantity stored in the storage unit, selects collection base point candidates based on the computed necessary collection quantity and the collection performance information stored in the storage unit, and appoints a collection base point which will be in charge of collection of the used products, from the selected collection base point candidates based on the cost information stored in the storage unit.

In the above-described recycled product distribution support apparatus, the storage unit may store identification information of each product and a recycling method for each product in association with each other.

In this case, it is preferred that the apparatus further comprises:

an identification information acquiring unit which acquires identification information of used products having been collected, from the client terminal at a collection base point via the communication network; and a recycling method specifying unit which specifies, by referring to the storage unit, a recycling method associated with the identification information of the used products acquired by the identification information acquiring unit.

In this case, it is preferred that in a case where the recycling method specified by the recycling method specifying unit is not product reusing where a product is recovered to a reusable state and reused, the instruction unit creates instruction information instructing that the used products having been collected be excluded from targets of product reusing, and sends the instruction information to the client terminal at the collection base point.

To achieve the above object, a program according to a second aspect of the present invention controls a computer to realize:

a function of acquiring information indicating a stock quantity of each type of products from a base point terminal at each base point via a communication network, and storing the acquired information;

a function of computing a stock reference quantity of each type of products and storing the computed quantity;

a function of acquiring past collection quantity information indicating a quantity of each type of products collected in past, from a base point terminal at a collection base point via the communication network, and storing the acquired information;

a function of acquiring yield information for each type of products from a base point terminal at a recovery base point via the communication network, and storing the acquired information;

a function of acquiring cost information indicating costs required for collecting and recovering used products from a base point terminal via the communication network and storing the acquired information;

a function of receiving order information for recycled products from a base point terminal at a sales base point via the communication network;

a function of computing a collection quantity of used products necessary for supplying recycled products, based on an ordered quantity, the stock quantity, and the stock reference quantity, when the order information is received;

a function of selecting collection base point candidates by which the computed collection quantity of used products can be collected, based on the past collection quantity information;

a function of appointing a collection base point which will be in charge of collection of used products from the selected collection base point candidates, based on the cost information; and a function of creating instruction information indicating a type of used products to be collected and the collection quantity, and sending the instruction information to a base point terminal at the appointed collection base point via the communication network.

According to the present invention, it is possible to compute the necessary collection quantity of used products in response to the reception of the order for recycled products, and to appoint distribution base points at which collection and recovery of products are done at the lowest cost.

BRIEF DESCRIPTION OF THE DRAWINGS

These objects and other objects and advantages of the present invention will become more apparent upon reading of the following detailed description and the accompanying drawings in which:

FIGS. 5A-5C are diagrams specifically showing the databases included in the storage unit;

FIGS. 6A-6C are diagrams specifically showing tables in the database included in the storage unit;

DETAILED DESCRIPTION OF THE PREFERRED EMBODIMENT

An embodiment for carrying out the present invention will now be explained with reference to the drawings. The present embodiment will be explained by employing a case where a company (hereinafter referred to as "company R") manufacturing and selling products (for example, multifunctional apparatuses, etc.) carries out recycling of manufactured products. In the present embodiment, recycling by "product reusing" where products which have ended their life and are collected from the market (hereinafter referred to as "collected apparatuses") will be treated with a recovery process and reused as recycled apparatuses will be carried out.

Figure 1:
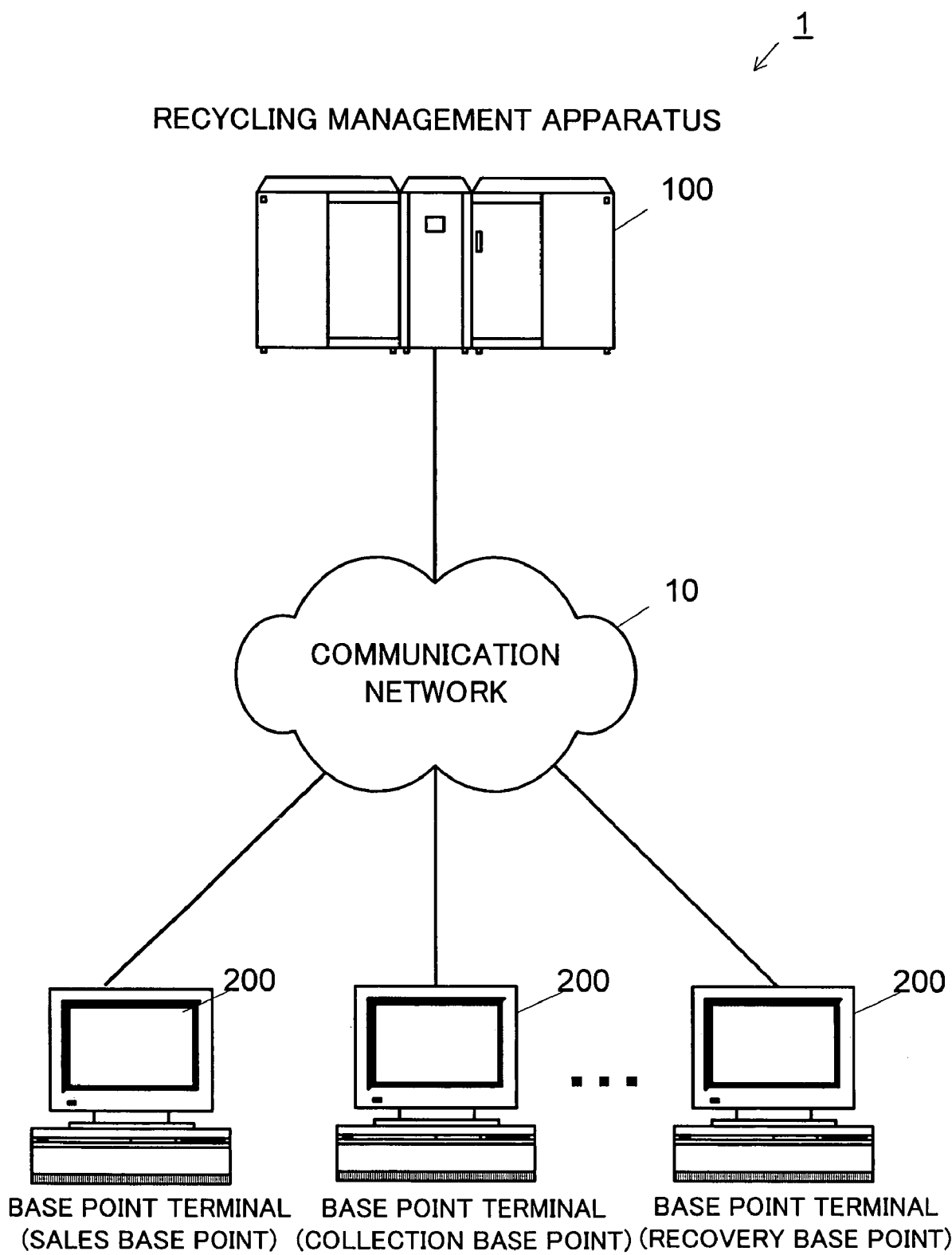
FIG. 1 is a diagram exemplarily showing the configuration of a recycled product distribution support system according to one embodiment of the present invention.

A recycling system according to the present embodiment will be explained with reference to FIG. 1. FIG. 1 is a diagram exemplarily showing the configuration of a recycled product distribution support system 1 according to the present embodiment. As shown in FIG. 1, the recycled product distribution support system 1 comprises a recycling management apparatus 100 and a plurality of base point terminals 200 which are connected to each other via a communication network 10.

The communication network 10 is a network for data transmission based on a predetermined communication program such as, for example, TCP/IP (Transmission Control Protocol/Internet Protocol). The communication network 10 connects the recycling management apparatus 100 and the base point terminals 200 to each other and intermediates between them for data transmission.

The recycling management apparatus 100 is constituted by an information processing apparatus such as, for example, a mainframe, a workstation, etc. The recycling management apparatus 100 performs information processing for supporting recycling activities carried out by the company R. According to the present embodiment, the recycling management apparatus 100 collects information from each base point terminal 200 via the communication network 10, and performs information processing based on the collected information to improve the efficiency of the recycling activities.

The base point terminal 200 is constituted by an information processing apparatus such as, for example, a workstation, a personal computer, etc., and used for tasks at each base point. According to the present embodiment, the information processing apparatus used for tasks at each of a sales base point, a collection base point, and a recovery base point is the base point terminal 200. A sales base point is a base point where products of the company R are sold, and according to the present embodiment, where sales of recycled apparatuses is also performed. A collection base point is a base point to where products of the company R having ended their life are collected. A recovery base point is a base point where collected apparatuses gathered at the collection base point are treated with a recovery process and recovered as recycled apparatuses. The base point terminal 200 installed at each of these base points provides various information acquired through tasks at each base point to the recycling management apparatus 100 via the communication network 10.

Figure 2:
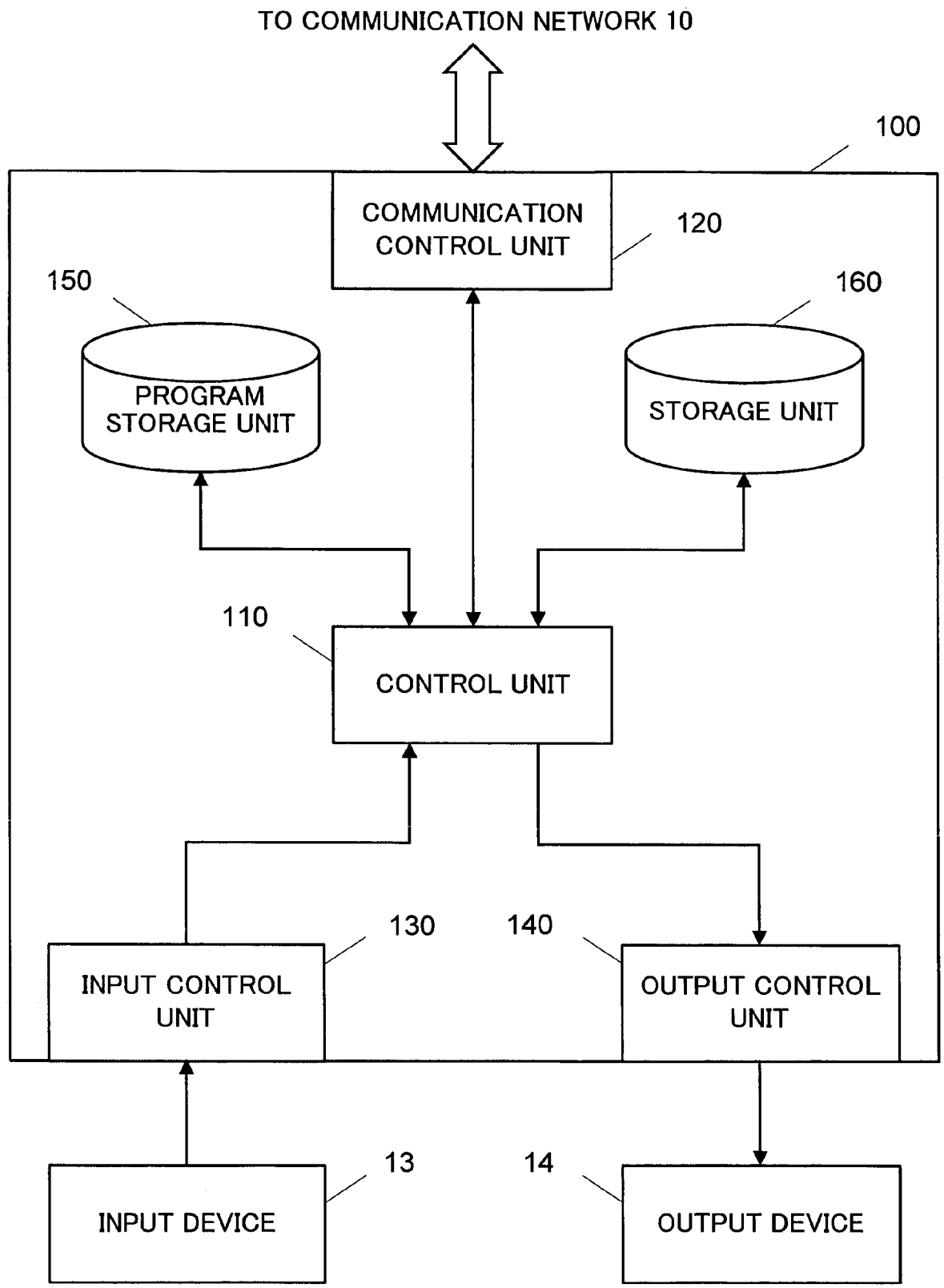
FIG. 2 is a block diagram showing the configuration of a recycling management apparatus.

The configuration of the recycling management apparatus 100 will be explained with reference to FIG. 2. FIG. 2 is a block diagram showing the configuration of the recycling management apparatus 100. As shown in FIG. 2, the recycling management apparatus 100 comprises a control unit 110, a communication control unit 120, an input control unit 130, an output control unit 140, a program storage unit 150, and a storage unit 160.

The control unit 110 is constituted by, for example, a CPU (Central Processing Unit), and a predetermined memory device (a RAM (Random Access Memory), etc.) serving as a work area. The control unit 110 controls each unit of the recycling management apparatus 100, and performs each of the processes to be described later based on a predetermined operation program stored in the program storage unit 150.

The communication control unit 120 is constituted by, for example, a predetermined communication device such as an NIC (Network Interface Card), a router, a modem, or the like. The communication control unit 120 connects the recycling management apparatus 100 to the communication network 10 to communicate with the base point terminals 200.

The input control unit 130 is connected to a predetermined input device 13 such as a keyboard, a pointing device, or the like, and transmits instructions entered from the input device 13 to the control unit 110.

The output control unit 140 is connected to a predetermined output device 14 such as a display device, a printer, or the like, and outputs process results, etc. of the control unit 110 to the output device 14 in accordance with necessity.

The program storage unit 150 is constituted by a predetermined storage device such as a hard disk device, a ROM (Read Only Memory), or the like, and stores various operation programs to be executed by the control unit 110. The operation programs stored in the program storage unit 150 are an arbitrary OS (Operating System) serving for the basic operations of the recycling management apparatus 100, and operation programs for realizing each process to be described later in cooperation with the OS. The processes of the recycling management apparatus 100 to be described later will be realized by the control unit 110 executing these operation programs.

Figure 3:
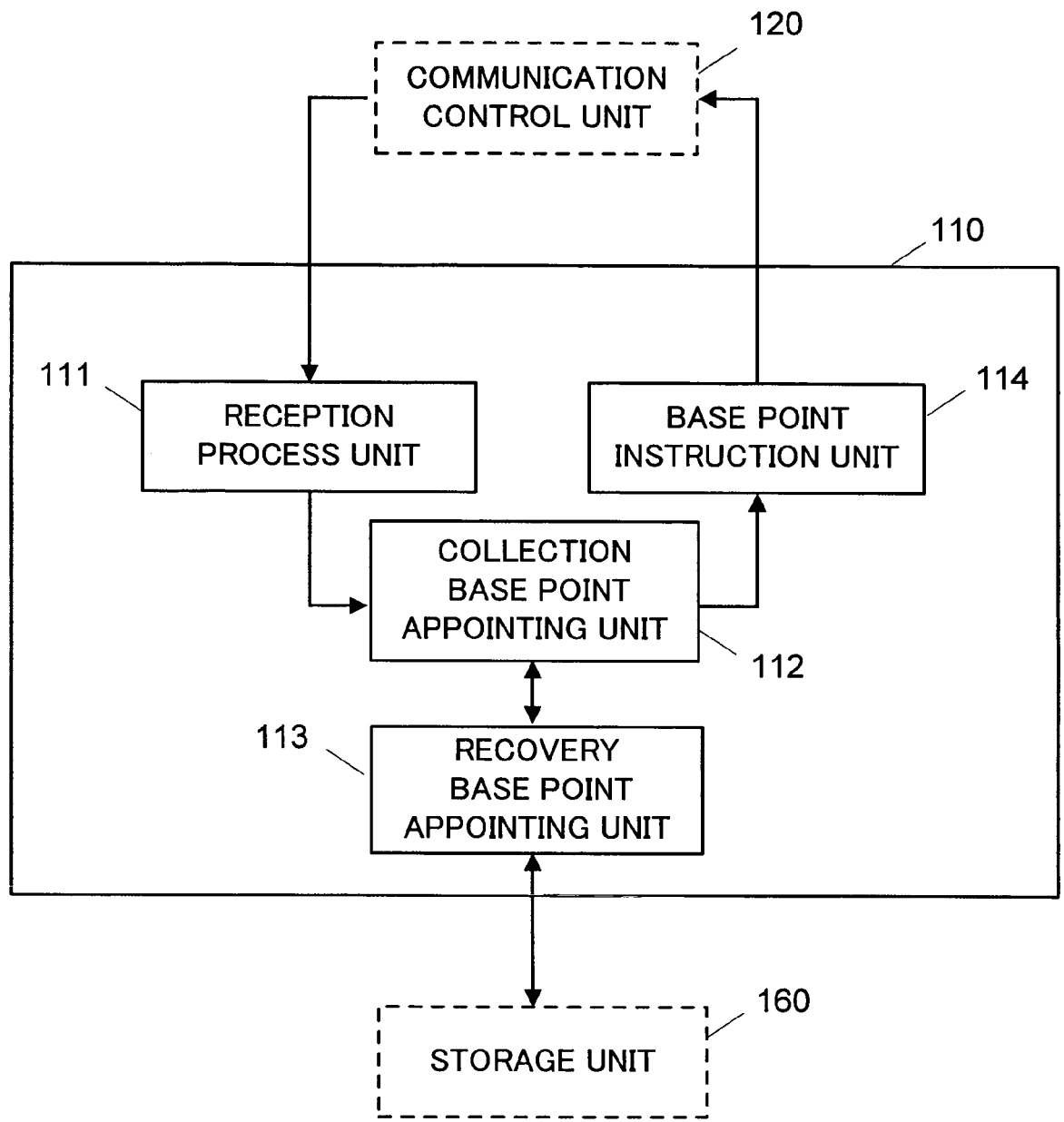
FIG. 3 is a functional block diagram showing functions realized by a control unit of the recycling management apparatus.

The control unit 110 of the recycling management apparatus 100 functions as configurations as shown in FIG. 3, by executing the programs. FIG. 3 is a functional block diagram showing the functions realized by the control unit 110. As shown in FIG. 3, the control unit 110 functions as a reception process unit 111, a collection base point appointing unit 112, a recovery base point appointing unit 113, and a base point instruction unit 114.

The reception process unit 111 receives various information from each base point terminal 200 by providing a web page, etc. to the base point terminal 200 via the communication network 10. Accordingly, the reception process unit 111 functions as a web server and provides web pages via the communication network 10 in cooperation with the communication control unit 120. Each base point terminal 200 has a function of accessing the recycling management apparatus 100 via the communication network 10 and browsing web pages provided by the recycling management apparatus 100.

In this manner, the reception process unit 111 acquires order information indicating the content of an order for a recycled apparatus at a sales base point. In order to provide a recycled apparatus in accordance with the received order, the reception process unit 111 determines the necessity of collecting an apparatus, and the necessity of a recovery task. The order information includes, for example, information indicating the type name of the ordered apparatus, the ordered quantity, and the delivery deadline, etc.

The collection base point appointing unit 112 appoints a collection base point at which a collection task necessary for providing a recycled apparatus in accordance with a demand can be efficiently performed, in a case where a collected apparatus becomes necessary to be secured due to a determination of the reception process unit 111. According to the present embodiment, the collection base point appointing unit 112 appoints a collection base point using information acquired from each base point terminal 200 and stored in a later-described database of the storage unit 160.

The recovery base point appointing unit 113 appoints a recovery base point at which a recovery task for the collected apparatus having been collected to the collection base point appointed by the collection base point appointing unit 112 can be efficiently performed. According to the present embodiment, the recovery base point appointing unit 113 appoints a recovery base point using information acquired from each base point terminal 200 and stored in a later-described database of the storage unit 160.

The base point instruction unit 114 instructs the sales base point having received an order, the collection base point appointed by the collection base point appointing unit 112, and the recovery base point appointed by the recovery base point appointing unit 113 to sell, to keep a collected apparatus, or to manufacture a recycled apparatus, etc.

According to the present embodiment, the base point instruction unit 114 gives an instruction to each targeted base point by creating an e-mail in a predetermined format and sending the created e-mail to the base point terminal 200 at the targeted base point in cooperation with the communication control unit 120. Accordingly, the recycling management apparatus 100 and the base point terminal 200 according to the present embodiment are configured to be able to transmit and receive e-mails via the communication network 10. Particularly, the recycling management apparatus 100 is configured to automatically create an e-mail and send it. In this case, fixed phrases to build up a predetermined format, an e-mail address at which each base point terminal 200 can receive e-mails, etc. are stored in the storage unit 160. The base point instruction unit 114 obtains these pieces of information, creates an e-mail indicating an instruction to each base point, and sends it.

According to the present embodiment, the control unit 110 functions as the above-described configurations by means of software processing by executing programs stored in the program storage unit 150. However, these configurations may be realized by hardware (so-called ASICs (Application Specific Integrated Circuits)).

Figure 4:
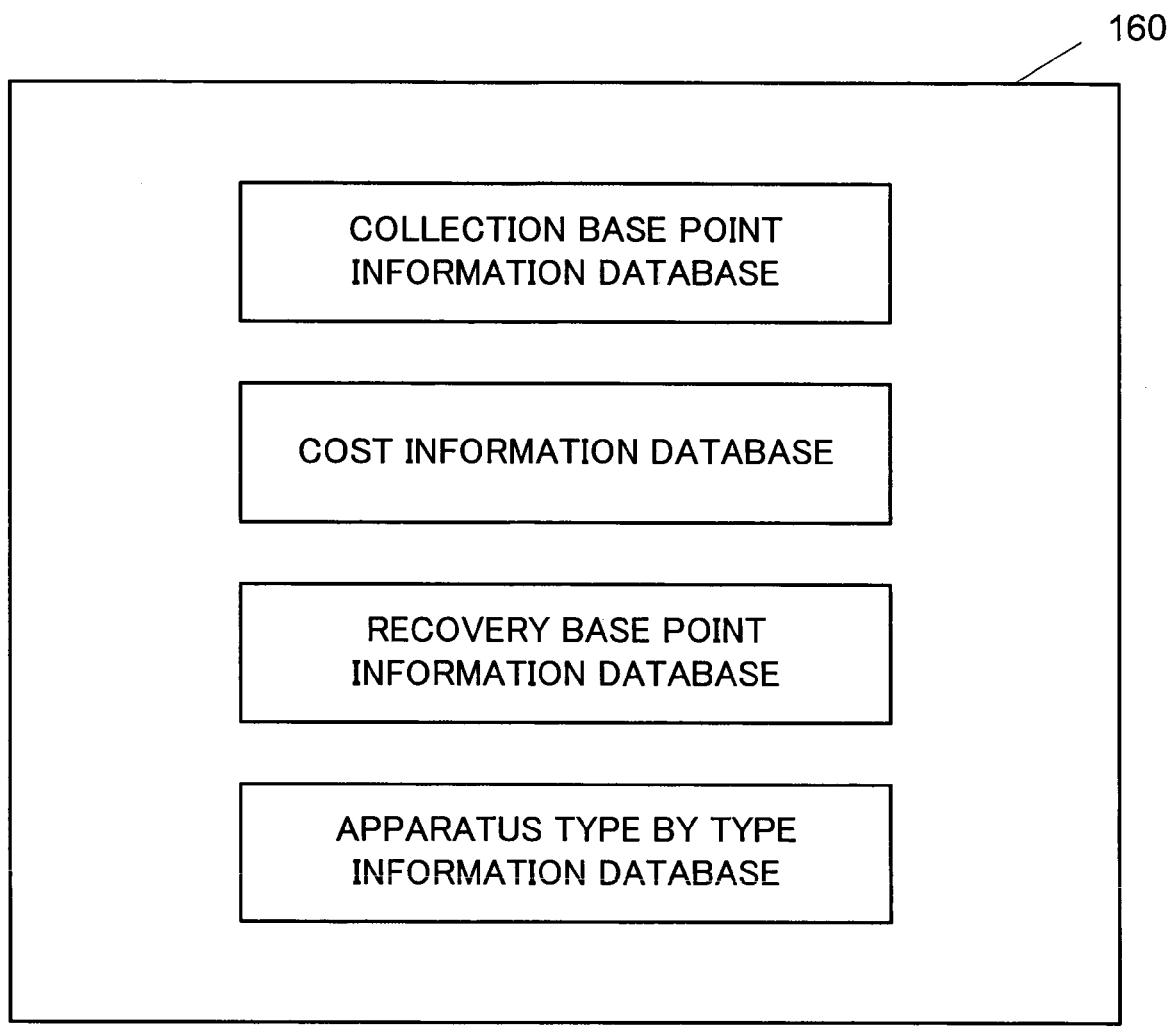
FIG. 4 is a diagram showing databases included in a storage unit of the recycling management apparatus.

The storage unit 160 is constituted by a predetermined storage device such as a RAM, a hard disk device, or the like, and stores various data necessary for carrying out product reusing. The storage unit 160 includes databases in which information collected from each base point terminal 200 is stored. According to the present embodiment, the storage unit 160 includes databases (DBs) shown in FIG. 4. As shown in FIG. 4, the storage unit 160 contains a "collection base point information database", a "cost information database", a "recovery base point information database", an "apparatus type by type information database", etc. Examples of information stored in each database will now be explained. For easier understanding, according to the present embodiment, four collection base points 1 to 4, four recovery base points 1 to 4, and four types of apparatuses A to D will be explained.

The configuration of the collection base point information database is shown in FIG. 5A. The collection base point information database stores information regarding types of apparatuses collectable at each collection base point, collection performance (past collection quantity) at each collection base point, cost of keeping collected apparatuses, etc. That is, as shown in FIG. 5A, a record is created for each collection base point so that information representing collection performance and storage cost for each apparatus type may be written. The collection performance is a monthly record of a collection quantity representing how many of each type of apparatuses have been collected. The collection quantity represents the number of apparatuses collected in the last month, or a monthly average number of collected apparatuses in a predetermined period of time. The storage cost represents how much it costs to store collected apparatuses at the collection base point concerned, and indicates, for example, a storage cost per collected apparatus. Information to be stored in the collection base point information database is acquired from time to time from the base point terminal 200 at each collection base point via the communication network 10.

The configuration of the cost information database is shown in FIG. 5B. As shown in FIG. 5B, the cost information database stores information representing the transportation cost required from each collection base point to each recovery base point. Here, the transportation cost per collected apparatus is recorded in the cost information database. Information to be stored in the cost information database is acquired from the base point terminal 200 at each recovery base point from time to time via the communication network 10.

The configuration of the recovery base point information database is shown in FIG. 5C. As shown in FIG. 5C, the recovery base point information database stores information representing types of apparatuses recoverable at each recovery base point, and recovery performance for each recoverable type of apparatus. The number of recyclable apparatuses which can be manufactured monthly is recorded as the recovery performance. Information to be stored in the recovery base point information database is acquired from time to time from the base point terminal 200 at each recovery base point via the communication network 10.

The configuration of the apparatus type by type information database is shown in FIGS. 6. The apparatus type by type information database stores information for each apparatus type. According to the present embodiment, a "stock table" (FIG. 6A) representing the quantity of each type of apparatuses available in stock, an "indicator table" (FIG. 6B) for recording a recycling efficiency indicator for each apparatus type, and a "recycling method table" (FIG. 6C) associating the manufacture date of each apparatus with a recycling method are created in the apparatus type by type information database.

As shown in FIG. 6A, the "stock table" has a table for each apparatus type, in which the current quantity of that type of apparatuses available in stock is recorded for each base point. This stock information is acquired from time to time from the base point terminal 200 at each base point via the communication network 10.

As shown in FIG. 6B, indicators such as "sales stock reference quantity", "recovery yield", "collected apparatus stock reference quantity", etc. are recorded in the "indicator table" for each apparatus type.

The sales stock reference quantity is a reference value representing a proper sales stock quantity for each apparatus type. A reference value for monthly stock is recorded as the sales stock reference quantity. A monthly sales goal which is set when sales of a newly released type of apparatus is started is set as the initial reference value, which thereafter will be updated monthly by the recycling management apparatus 100 based on, for example, the monthly change in the stock quantity. That is, the sales stock reference quantity is computed by the recycling management apparatus 100 as needed, and stored in the apparatus type by type information database. By optimizing the stock quantity in sales districts based on the sales stock reference quantity, it is possible to prevent missing sales opportunities and to promote reductions in the stock keeping cost. This will contribute to improving the cash flow.

The recovery yield indicates the yield of recovering collected apparatuses. Since collected apparatuses are used products and might have been damaged when used or transported, all the collected apparatuses cannot be refreshed to recycled apparatuses. The recovery yield indicates the rate of apparatuses that can be recovered to recycled apparatuses with respect to the collected apparatuses, for each apparatus type. The recovery yield information is acquired from time to time from the base point terminal 200 at each recovery base point via the communication network 10.

The collected apparatus stock reference quantity is a reference value indicating a proper stock quantity of collected apparatuses. This reference quantity is set by calculating, for example, "sales reference value÷recovery yield". The collected apparatus stock reference quantity is computed by the recycling management apparatus 100 as needed, and stored in the apparatus type by type information database.

As shown in FIG. 6C, in the "recycling method table", a table is created for each apparatus type. In each table, a record is, created for each one-year period of manufacture. Manufacture numbers of the apparatuses of the type concerned which are manufactured during the one-year manufacture period concerned are indexed in the record. Further, a recycling method that is appropriate for the manufacture period concerned is written. According to the present embodiment, three kinds of recycling methods are assumed, namely, "simplified recovery", "intensive recovery", and "resource recovery". "Simplified recovery" means that a collected apparatus can be recovered as a recycled apparatus simply by its outer casing being cleaned. "Intensive recovery" means that a collected apparatus can be recovered as a recycled apparatus by being decomposed for cleaning, or by its components being replaced, etc. "Resource recovery" means that a collected apparatus is difficult to reuse as a recycled apparatus, therefore is to be decomposed into component levels to be recycled as resources. That is, even the apparatuses of the same type vary in their quality according to how long they were used. Therefore, by making it possible to select appropriate recycling methods according to the manufacture periods of the collected apparatuses, it is intended to maintain the quality of the recycled apparatuses to a predetermined level or higher. The information to be recorded on the recycling method table is acquired from time to time from the base point terminal 200 at the recovery base point via the communication network 10.

Other than the databases described above, information representing process results of the control unit 110 is stored in the storage unit 160 as needed.

Operations of the recycled product distribution support system 1 having the above-described configurations will now be explained. In the present embodiment, the recycled product distribution support system 1 supports efficient distribution of recycled products when an order for recycled apparatuses is received at a sales base point, by determining a necessary quantity of collection and appointing an appropriate collection base point and a recovery base point to give instructions thereto so that the customer's demanded quantity of recycled apparatuses will be efficiently supplied.

First, a "recycled apparatus distribution support process" performed by the recycling management apparatus 100 will be explained with reference to the flowchart shown in FIG. 7. This process is started when order information is input into the recycling management apparatus 100. In order to perform this process, the control unit 110 functions as the reception process unit 111, the collection base point appointing unit 112, the recovery base point appointing unit 113, and the base point instruction unit 114 by executing an operation program stored in the program storage unit 150.

When order information is input, the reception process unit 111 accesses the apparatus type by type information database. The reception process unit 111 determines whether the current stock quantity of the apparatuses of the type concerned is equal to or greater than the ordered quantity indicated in the order information (step S101).

In a case where there is a stock equal to or greater than the ordered quantity (step S101: Yes), the reception process unit 111 subtracts the ordered quantity from the current stock quantity to compute the stock quantity of the apparatus of the type concerned after the order reception is completed. That is, the reception process unit 111 computes the stock quantity after the ordered quantity of recycled apparatuses have been supplied to the customer. Then, the reception process unit 111 determines whether the stock quantity after the completion of order reception is equal to or smaller than the stock reference quantities (sales stock reference quantity and collected apparatus stock reference quantity) set for the apparatus type concerned (step S102).

In a case where there is a less stock than currently required (step S101: No) or in a case where the stock after the completion of order reception is equal to or smaller than the stock reference quantities (step S102: Yes), which means that it is impossible to supply the ordered quantity of apparatuses or to maintain the proper stock quantity, it is necessary to secure collected apparatuses and manufacture recycled apparatuses. In this case, the collection base point appointing unit 112 performs a "collection base point appointing process" to appoint a collection base point for securing collected apparatuses for the type concerned (step S200).

On the other hand, in a case where the necessary stock is currently available and also a sufficient stock can be maintained after the completion of order reception (step S102: No), it is possible to supply the ordered quantity of recycled apparatuses without newly manufacturing recycled apparatuses. In this case, the base point instruction unit 114 sends notification information saying that the necessary quantity of apparatuses are currently securable to the base point terminal 200 at the sales base point having received the order (step S103), and terminates the process. In this case, the sales base point concerned cooperates with other base points to secure the necessary quantity of recycled apparatuses and supply them to the customer.

Figure 8:
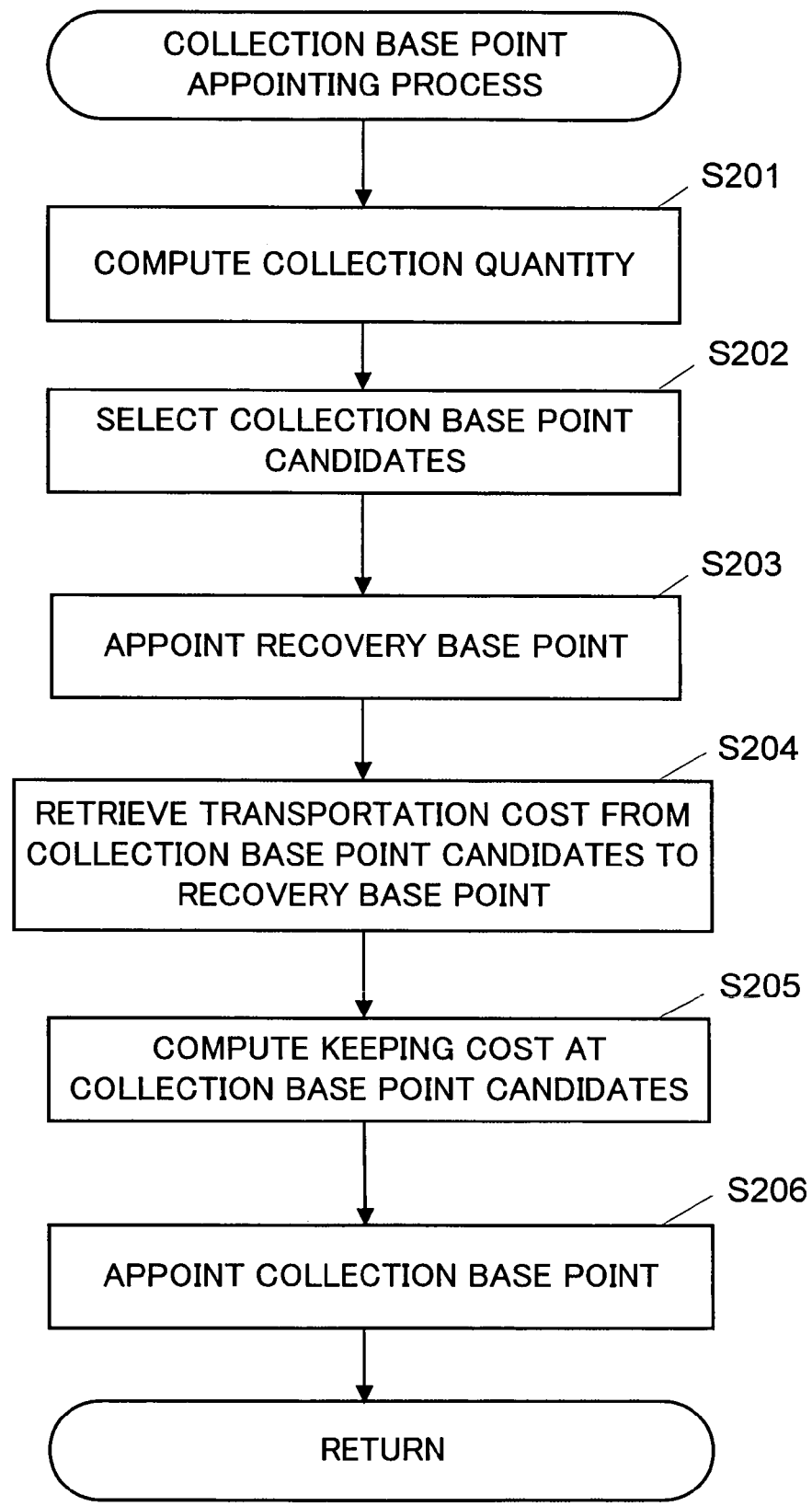
FIG. 8 is a flowchart showing a collection base point appointing process.

Next, a "collection base point appointing process" will be explained with reference to the flowchart shown in FIG. 8.

The collection base point appointing unit 112 computes the quantity of collected apparatuses to be newly secured based on the order information and the information stored in the databases of the storage unit 160 (step S201).

Here, an example case where received is an order in which the type of the ordered apparatus is type A, the ordered quantity is 80, and the delivery deadline is 45 days after order reception will be explained. As shown in FIG. 6A, the current stock quantity of the type A is 20 at the sales districts (sales base points), 0 at the collection base point, and 0 at the recovery base point. Further, as shown in FIG. 5A, the collection base point that has collected many type-A apparatuses is the collection base point 1, which has collected about 40 apparatuses in a month. Therefore, it is expected that 40 apparatuses of the type A will be collected to the collection base point 1 before the deadline.

The ordered quantity is 80 and the sales districts have 20 apparatuses of the type A that can be immediately supplied as recycled apparatuses. Therefore, the quantity of recycled apparatuses of the type A that have to be newly manufactured is 60. Since the quantity of type-A apparatuses that can be collected to the collection base point 1 is 40, 20 more apparatuses of the type A have to be collected. At this time, the collection base point appointing unit 112 refers to the recovery yield shown in FIG. 6B, and computes the quantity of apparatuses to be collected that are required to securely manufacture the ordered quantity of recycled apparatuses. In this case, since the recovery yield of the type A is 85%, 30 apparatuses of the type A should be newly collected to manufacture the ordered quantity of recycled apparatuses.

When the quantity of apparatuses to be newly collected is computed, the collection base point appointing unit 112 appoints the collection base point that will be put in charge of the collection. As shown in FIG. 5A, not only the collection base point 1 but also other collection base points 2 to 4 collect apparatuses of the type A. These collection base points can therefore be selected as candidates. The monthly collection quantity of type-A apparatuses of the collection base point 2 is 20, and that of the collection base points 3 and 4 is 10 respectively. Accordingly, to obtain 30 collected apparatuses, there are two available approaches, namely "collection base point 2+collection base point 3" and "collection base point 2+collection base point 4". In sum, the collection base point appointing unit 112 selects collection base point candidates based on the collection base point information (step S202).

In the case where there are a plurality of combinations of collection base point candidates by which the necessary quantity of collected apparatuses can be obtained, the collection base point appointing unit 112 determines which collection base points are to be put in charge of the collection, based on costs. Here, the collection base point appointing unit 112 appoints collection base points which will achieve lower costs, by computing the keeping cost and transportation cost from the collection base point to the recovery base point for each collection base point, and comparing them.

To compute the transportation cost, it is necessary to determine the target recovery base point. The recovery base point appointing unit 113 appoints an appropriate recovery base point. In the present embodiment, as shown in FIG. 5C, since the recovery base point where the recovery of the type-A apparatuses is done is the recovery base point 1, the recovery base point 1 is appointed by the recovery base point appointing unit 113 (step S203).

The collection base point appointing unit 112 accesses the cost information database shown in FIG. 5B, and retrieves the transportation cost required for transporting collected apparatuses from each of the collection base point candidates (collection base points 2 to 4) to the recovery base point 1 (step S204). Further, the collection base point appointing unit 112 computes the keeping cost at each collection base point candidate based on the keeping cost in the collection base point information database shown in FIG. 5A (step S205).

In case of "collection base point 2+collection base point 3", the collection base point appointing unit 112 computes the cost for collecting 20 apparatuses at the collection base point 2 and collecting 10 apparatuses at the collection base point 3. That is, the cost will be (1,800 yen×20 apparatuses+1,500 yen×10 apparatuses)+(300 yen×20 apparatuses+300 yen×10 apparatuses)=60,000 yen.

On the other hand, in case of "collection base point 2+collection base point 4", the collection base point appointing unit 112 computes the cost for collecting 20 apparatuses at the collection base point 2 and collecting 10 apparatuses at the collection base point 4. That is, the cost will be (1,800 yen×20 apparatuses+1,000 yen×10 apparatuses)+(300 yen×20 apparatuses+350 yen×10 apparatuses)=55,500 yen.

Accordingly, it turns out that collection by "collection base point 2+collection base point 4" will result in a lower cost. The collection base point appointing unit 112 appoints the collection base point 2 and the collection base point 4 as the collection base points to be newly in charge. In sum, the collection base point appointing unit 112 appoints the collection base points that are to secure collected apparatuses, from the collection base point candidates based on the computed costs (step S206).

In the above-described example, there is one recovery base point where recovery of the type-A apparatuses is done. In a case where there are a plurality of such recovery base points, the collection base point appointing unit 112 and the recovery base point appointing unit 113 calculate the transportation costs by regarding each of these as the recovery base point candidate. That is, the collection base point appointing unit 112 and the recovery base point appointing unit 113 compute the transportation cost for each combination of a collection base point candidate and a recovery base point candidate. On this basis, the collection base point appointing unit 112 and the recovery base point appointing unit 113 appoint the collection base point and recovery base point at which the cost will be the lowest.

Figure 7:
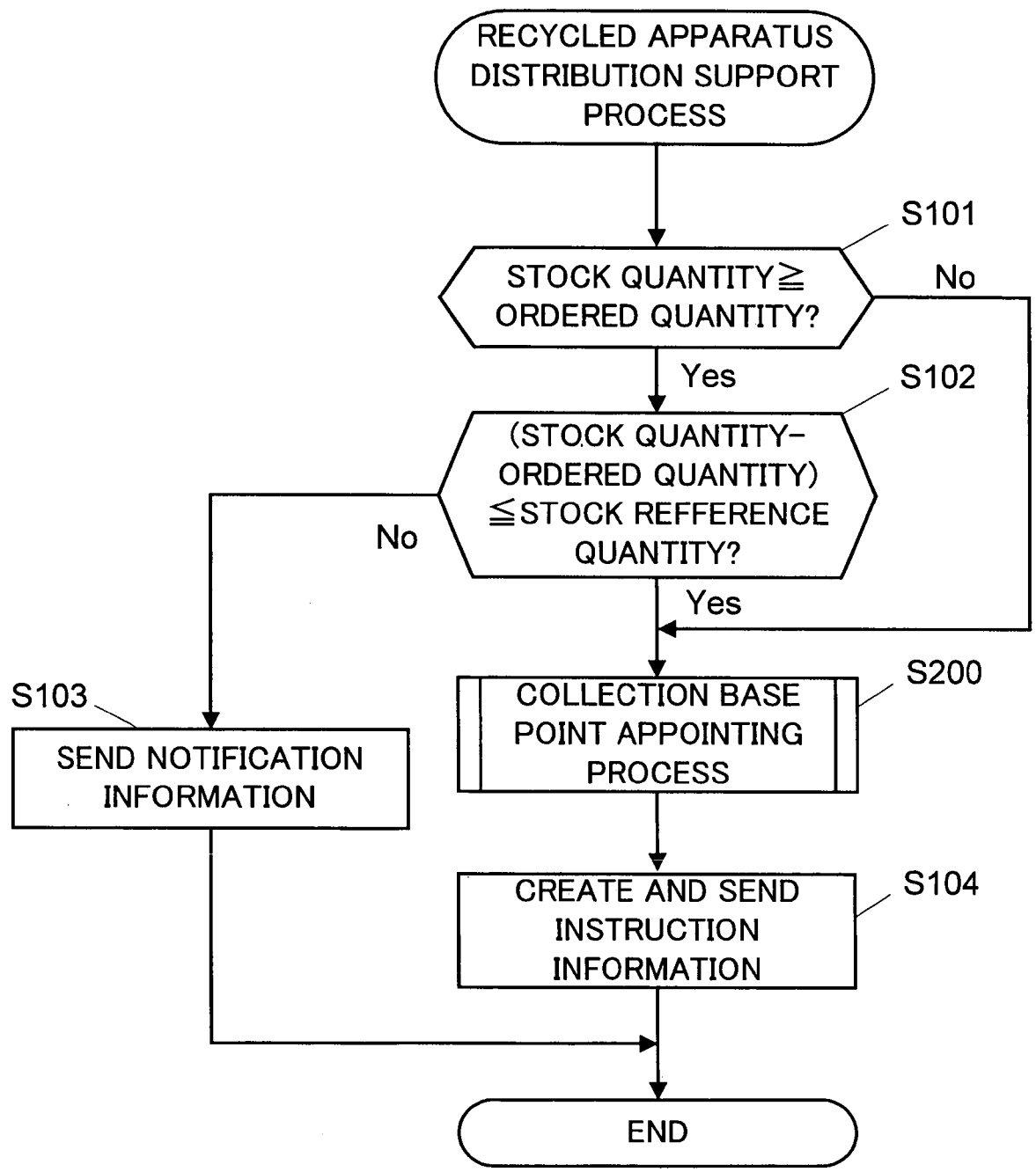
FIG. 7 is a flowchart showing a recycled apparatus distribution support process.

When the collection base points are appointed at step S206, the collection base point appointing unit 112 terminates the collection base point appointing process, and returns to the flow of the recycled apparatus distribution support process shown in FIG. 7.

Then, the base point instruction unit 114 creates instruction information for instructing collected apparatuses to be secured and subjected to a recovery process, and sends the instruction information from the communication control unit 120 to the appointed collection base points and to the appointed recovery base point via the communication network 10 (step S104).

The instruction information to be sent to the appointed collection base points is the type and quantity of the collected apparatuses to be secured, and the recovery base point to where the collected apparatuses are to be transported. In the above-described example, the collection base points 1, 2, and 4 are the target. The base point instruction unit 114 creates instruction information for the collection base point 1 that 40 apparatuses of the type A should be collected, kept, and transported to the recovery base point 1. The base point instruction unit 114 creates instruction information for the collection base point 2 that 20 apparatuses of the type A should be collected, kept, and transported to the recovery base point 1. The base point instruction unit 114 creates instruction information for the collection base point 4 that 10 apparatuses of the type A should be collected, kept, and transported to the recovery base point 1.

Further, the base point instruction unit 114 creates instruction information for the selected recovery base point including the type and quantity of the apparatuses to be recovered, and the delivery deadline and the sales base point to where the apparatuses are to be delivered. In the above-described example, the recovery base point 1 is the target. The base point instruction unit 114 creates instruction information for the recovery base point 1 that 80 apparatuses of the type A should be manufactured as recycled apparatuses, and delivered to the sales base point having received the order by the appointed deadline.

The base point instruction unit 114 creates such instruction information in the form of, for example, e-mail, and sends it to the base point terminals 200 at the corresponding base points from the communication control unit 120 via the communication network 10. When sending, the base point instruction unit 114 affixes identification (ID) information unique to each instruction and notifies the instruction to each base point.

When sending of the instruction information to the appointed collection base points and recovery base point is completed, the process is finished.

By the above-described processes, collection base points and recovery base points by which the necessary quantity of apparatuses in accordance with the order can be secured at a low cost by the deadline are appointed. Since the recovery yield is taken into consideration in computing the necessary quantity and the appointed collection base points are instructed to keep the collected apparatuses, the ordered quantity of apparatuses can be supplied by the deadline without fail. Besides, since whether collection is necessary to be done or not is determined in consideration of the stock reference quantity, it is possible to distribute recycled apparatuses at a low cost while maintaining the proper stock quantity.

In the above-described example, the case where the sales districts have an available stock and the collection base points and recovery base points have no stock is illustrated. However, generally, the recycling management apparatus 100 gives instructions based on the stock quantities at the respective base points. For example, in a case where there is a sufficient stock at the collection base points, the recycling management apparatus 100 appoints a recovery base point that is the least cost-consuming, and instructs the collection base points to transport the collected apparatuses to this recovery base point. Or, in a case where there is a sufficient stock at the recovery base points, the recycling management apparatus 100 instructs the recovery base points to deliver the apparatuses to the sales base point having received the order by the appointed deadline.

Figure 9:
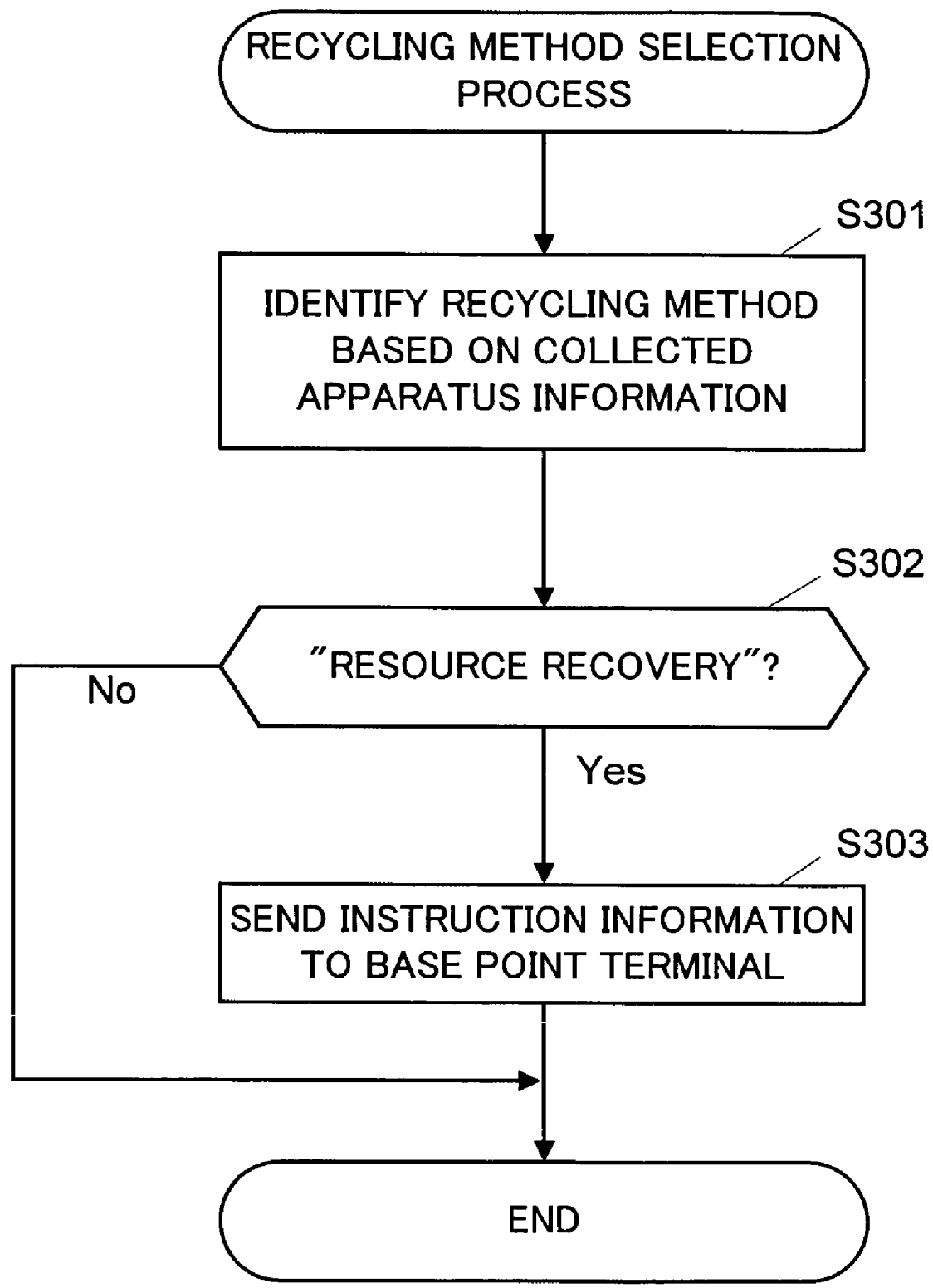
FIG. 9 is a flowchart showing a recycling method selection process.

Next, a "recycling method selection process" for selecting a recycling method for each collected apparatus collected to the collection base points will be explained with reference to the flowchart shown in FIG. 9. This process is started when the base point terminal 200 at a collection base point, which has collected apparatuses of the targeted type, inputs the details about the collected apparatus to the recycling management apparatus 100. Information representing the details of the collected apparatuses (hereinafter referred to as "collected apparatus information") is input to the recycling management apparatus 100 via a web page, etc. provided by the reception process unit 111 of the recycling management apparatus 100. The collected apparatus information includes at least the type of the collected apparatuses and a manufacture number (a serial number given in the order of manufacture) assigned uniquely to each apparatus.

When collected apparatus information is input, the reception process unit 111 accesses the recycling method table (FIG. 6C) in the apparatus type by type information database, and specifies the record corresponding to the manufacture number indicated in the input collected apparatus information from the table for the apparatus type that is indicated in the input collected apparatus information. Then, the reception process unit 111 identifies the recycling method represented in the specified record (step S301).

The reception process unit 111 determines whether the identified recycling method is resource recovery or not (step S302). According to the present embodiment, assumed is a case where collected apparatuses are recovered at a recovery base point so that the products will be reused. Resource recovery where apparatuses are decomposed into components for material recycling, is a different type of recycling method from product reusing. Therefore, if resource recovery is appropriate because the year's type of the collected apparatuses is too old, such collected apparatuses will not be the target of product reusing. In such a case (step S302: Yes), the base point instruction unit 114 creates instruction information that such collected apparatuses should be excluded from the keeping target apparatuses that are instructed to be kept by the instruction information sent to the corresponding collection base points in the above-described "collection base point appointing process". The base point instruction unit 114 sends the created instruction information to the base point terminals 200 at the corresponding collection base points from the communication control unit 120 via the communication network 10 (step S303).

On the other hand, in a case where the identified recycling method is not the resource recovery (step S302: No), the recycling management apparatus 100 ends the process with no more actions, since the collected apparatuses are suitable as recycled apparatuses for product reusing.

By this process, an appropriate method is selected based on the manufacture date of the collected apparatuses, and the recycling management apparatus 100 instructs the collection base points to exclude some apparatuses from keeping targets instructed to be kept in accordance with the order, if the apparatuses are not suitable for product reusing. Because of this, it is possible to select out only such collected apparatuses as necessary for securing recycled apparatuses for product reusing at the collection base points. It is also possible to prevent collected apparatuses unstable for product reusing from being distributed as recycled apparatuses, and therefore to maintain the quality of the recycled apparatuses to a predetermined level or higher.

As explained above, by applying the present invention in the way of the present embodiment for the purpose of product reusing involving used product collection, it is possible to minimize the distribution cost while meeting the request of the order. Accordingly, improvement in the efficiency in distribution for product reusing can be expected, besides homogeneous recycled products can be distributed. Because of this, the market competitiveness in the recycled product sales will be enhanced and product reusing will become a more popular practice, and this will lead to the reduction of environmental impacts.

The above-described embodiment is an example, and application of the present invention is not limited to this. The present invention can be applied in various manners, and any types of embodiments may be included in the scope of the present invention.

For example, in the above-described embodiment, information input from the sales base point or from the collection base point to the recycling management apparatus 100 is via a web page provided by the recycling management apparatus 100. However, this is not the only case, but an operator may input information to the recycling management apparatus 100 based on reports from each base points.

Instructions from the base point instruction unit 114 to each base point are given by e-mails, as has been explained above. However, the instruction manner is not limited to this, but an instruction form sheet indicating the instruction contents may be generated and output. If the communication control unit 120 has a facsimile transmission function, it may fax the generated form sheet to the target base point.

The recycling management apparatus 100 according to the above-described embodiment can be realized by a dedicated apparatus, and also can be realized by a general-purpose computer system. In this case, a general-purpose computer system can be made to function as the recycling management apparatus 100 by installing a program for realizing the above-described processes in the computer system and executing the program in cooperation with the OS.

Such a program may be provided in an arbitrary manner. It may be provided by being stored in a recording medium such as a CD-ROM or the like, or may be provided via a communication medium such as, for example, the Internet.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2004-287729 filed on Sep. 30, 2004 and including specification, claims, drawings and summary. The disclosure of the above Japanese Patent Application is incorporated herein by reference in its entirety.

What is claimed is:

1. A recycled product distribution support apparatus, comprising:
    a storage unit which acquires information from a client terminal via a communication network and stores the information;
    an order information reception unit which receives order information from said client terminal via said communication network;
    a collection necessity determination unit which determines whether or not it is necessary to collect used products necessary for supplying recycled products having been ordered, based on the order information received by said order information reception unit and the information stored in said storage unit;
    a recovery base point appointing unit which appoints a recovery base point which will be in charge of recovery of the used products, based on the information indicating recovery performance of recovery base point stored in said storage unit, in a case where said collection necessity determination unit determines that it is necessary to collect used products;
    a collection base point appointing unit which appoints a collection base point which will be in charge of collection of the used products, in a case where said collection necessity determination unit determines that it is necessary to collect used products; and
    an instruction unit which creates instruction information for instructing that the used products be recovered, and sends the instruction information to said client terminal installed at the recovery base point appointed by said recovery base point appointing unit, and which creates instruction information for instructing that the used products be kept, and sends the instruction information to said client terminal installed at the collection base point appointed by said collection base point appointing unit, wherein said collection base point appointing unit appoints a collection base point based on a cost required for collecting and recovering the used products.

2. The recycled product distribution support apparatus according to claim 1, wherein:

said storage unit stores information indicating a stock quantity of each type of products and a stock reference quantity of each type of products; and said collection necessity determination unit determines whether or not it is necessary to collect used products, based on an ordered quantity indicated in the order information, and the stock quantity and stock reference quantity stored in said storage unit.

3. The recycled product distribution support apparatus according to claim 2, wherein:

said storage unit stores collection performance information indicating a collection performance of each type of products at each collection base point, and cost information indicating a transportation cost required from a collection base point to a recovery base point and a keeping cost required at each collection base point; and said collection base point appointing unit computes a necessary collection quantity representing how many used products should be collected, based on the ordered quantity indicated in the order information and the stock quantity and stock reference quantity stored in said storage unit, selects collection base point candidates based on the computed necessary collection quantity and the collection performance information stored in said storage unit, and appoints a collection base point which will be in charge of collection of the used products, from the selected collection base point candidates based on the cost information stored in said storage unit.

4. The recycled product distribution support apparatus according to claim 1, wherein said storage unit stores identification information of each product and a recycling method for each product in association with each other, said apparatus further comprises an identification information acquiring unit which acquires identification information of used products having been collected, from said client terminal at a collection base point via said communication network, and a recycling method specifying unit which specifies, by referring to said storage unit, a recycling method associated with the identification information of the used products acquired by said identification information acquiring unit, and in a case where the recycling method specified by said recycling method specifying unit is not product reusing where a product is recovered to a reusable state and reused, said instruction unit creates instruction information instructing that the used products having been collected be excluded from targets of product reusing, and sends the instruction information to said client terminal at the collection base point.

5. A computer-readable storage medium in which a program is recorded, said program executing a method comprising:

acquiring information indicating a stock quantity of each type of product from a base point terminal at each base point via a communication network, and storing the acquired information;

computing a stock reference quantity of each type of product and storing the computed quantity;

acquiring past collection quantity information indicating a quantity of each type of product collected in past, from a base point terminal at a collection base point via said communication network, and storing the acquired information;

acquiring yield information for each type of product from a base point terminal at a recovery base point via said communication network, and storing the acquired information;

acquiring cost information indicating costs required for collecting and recovering used products from a base point terminal via said communication network and storing the acquired information;

acquiring recovery performance information indicating a recovery performance of a recovery base point from a base point terminal at the recovery base point via said communication network, and storing the acquired information;

receiving order information for recycled products from a base point terminal at a sales base point via said communication network;

computing a collection quantity of used products necessary for supplying recycled products, based on an ordered quantity, the stock quantity, and the stock reference quantity, when the order information is received;

selecting collection base point candidates by which the computed collection quantity of used products can be collected, based on the past collection quantity information;

appointing a recovery base point which will be in charge of recovery of used products, based on the recovery performance information;

appointing a collection base point which will be in charge of collection of used products from the selected collection base point candidates, based on the cost information;

creating instruction information indicating a type of used product to be recovered and the recovery quantity, and sending the instruction information to a base point terminal at the appointed recovery base point via said communication network; and creating instruction information indicating a type of used product to be collected and the collection quantity, and sending the instruction information to a base point terminal at the appointed collection base point via said communication network.

* * * * *